(12) United States Patent
Kim et al.

(10) Patent No.: US 9,705,534 B2
(45) Date of Patent: Jul. 11, 2017

(54) ELECTRONIC DEVICE USING ANTENNA

(71) Applicant: Samsung Electronics Co., Ltd., Gyeonggi-do (KR)

(72) Inventors: Min Ho Kim, Seoul (KR); Sung Min Lee, Seoul (KR); Jong Pil Lee, Gyeonggi-do (KR); Sung Chul Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/842,480

(22) Filed: Sep. 1, 2015

(65) Prior Publication Data

US 2016/0065247 A1 Mar. 3, 2016

(30) Foreign Application Priority Data

Sep. 1, 2014 (KR) .................. 10-2014-0115477

(51) Int. Cl.
| | | |
|---|---|---|
| *H04B 1/44* | (2006.01) | |
| *H04B 1/00* | (2006.01) | |
| *H01Q 5/30* | (2015.01) | |
| *H04L 12/911* | (2013.01) | |
| *H04L 5/00* | (2006.01) | |

(52) U.S. Cl.
CPC ............. *H04B 1/0064* (2013.01); *H01Q 5/30* (2015.01); *H04L 47/827* (2013.01); *H04L 5/001* (2013.01)

(58) Field of Classification Search
CPC ...... H01Q 5/30; H04B 1/0064; H04L 47/827; H04L 5/001
USPC ............ 455/272, 277.1, 41.1, 41.2, 91, 337; 370/278, 297, 273, 277, 310, 203, 204, 370/207, 208; 375/219, 340, 316; 333/132; 235/492

See application file for complete search history.

(56) References Cited

U.S. PATENT DOCUMENTS

| | | | | |
|---|---|---|---|---|
| 7,952,987 | B2* | 5/2011 | Chang ................. | H04L 27/2607 370/203 |
| 8,620,245 | B2* | 12/2013 | Chung .................. | H01Q 1/243 375/267 |
| 2003/0050032 | A1* | 3/2003 | Masaki ................. | H01Q 1/243 455/272 |
| 2006/0019612 | A1* | 1/2006 | Obara ...................... | H04B 1/50 455/78 |
| 2006/0160564 | A1* | 7/2006 | Beamish ............. | H04B 1/3805 455/553.1 |
| 2008/0042777 | A1* | 2/2008 | Lee ...................... | H04B 1/0064 333/132 |
| 2009/0135078 | A1* | 5/2009 | Lindmark ............. | H01Q 1/523 343/844 |

(Continued)

FOREIGN PATENT DOCUMENTS

KR 10-1175905 8/2012

OTHER PUBLICATIONS

European Search Report dated Jan. 28, 2016 issued in counterpart application No. 15182537.9-1874, 9 pages.

*Primary Examiner* — Tan H Trinh
(74) *Attorney, Agent, or Firm* — The Farrell Firm, P.C.

(57) ABSTRACT

An electronic device is provided, which includes an antenna; and a communication processor configured to transmit and receive a first signal corresponding to a first frequency band through the antenna, and to perform one of transmitting and receiving a second signal corresponding to a second frequency band through the antenna.

17 Claims, 10 Drawing Sheets

(56) References Cited

U.S. PATENT DOCUMENTS

| | | | |
|---|---|---|---|
| 2009/0218407 A1* | 9/2009 | Rofougaran | G06K 19/0724 235/492 |
| 2009/0312050 A1* | 12/2009 | Tang | H04B 1/006 455/553.1 |
| 2010/0197263 A1* | 8/2010 | Dwyer | H04B 7/12 455/272 |
| 2011/0045786 A1* | 2/2011 | Leinonen | H01Q 3/24 455/78 |
| 2011/0223925 A1* | 9/2011 | Gale | H01Q 1/246 455/450 |
| 2011/0292844 A1* | 12/2011 | Kwun | H04B 1/0057 370/278 |
| 2012/0315861 A1* | 12/2012 | Wu | H04B 7/08 455/73 |
| 2013/0016633 A1* | 1/2013 | Lum | H04B 1/0057 370/277 |
| 2013/0165058 A1* | 6/2013 | Mostafa | H04B 1/0064 455/91 |
| 2013/0176913 A1* | 7/2013 | Niskanen | H04B 1/48 370/278 |
| 2013/0230080 A1* | 9/2013 | Gudem | H04B 1/0057 375/219 |
| 2014/0003300 A1* | 1/2014 | Weissman | H04B 7/0404 370/273 |
| 2014/0105079 A1* | 4/2014 | Bengtsson | H04B 1/005 370/297 |
| 2014/0112213 A1* | 4/2014 | Norholm | H04B 1/56 370/277 |
| 2014/0133364 A1* | 5/2014 | Weissman | H04B 1/0057 370/273 |
| 2014/0185498 A1* | 7/2014 | Schwent | H04B 1/0057 370/297 |
| 2014/0293841 A1* | 10/2014 | Rousu | H04B 1/006 370/278 |
| 2014/0327587 A1* | 11/2014 | Won | H01Q 5/335 343/720 |
| 2015/0105120 A1* | 4/2015 | Lim | H04W 36/0022 455/552.1 |
| 2015/0304059 A1* | 10/2015 | Zuo | H04J 1/08 370/343 |
| 2015/0364820 A1* | 12/2015 | Dong | H01Q 5/10 343/729 |
| 2015/0365946 A1* | 12/2015 | Luong | H04W 72/0453 370/329 |
| 2016/0020737 A1* | 1/2016 | Kong | H03F 3/19 455/73 |

\* cited by examiner

ELECTRONIC DEVICE USING ANTENNA

PRIORITY

This application claims priority under 35 U.S.C. §119(a) to Korean Patent Application Serial No. 10-2014-0115477, which was filed in the Korean Intellectual Property Office on Sep. 1, 2014, the entire disclosure of which is incorporated herein by reference.

BACKGROUND

1. Field of the Disclosure

The present disclosure relates generally to an electronic device using an antenna.

2. Description of the Related Art

An antenna is used by an electronic device in order to communicate with a network. A single input and single output (SISO) system using one antenna has developed into a multiple input and multiple output (MIMO) system using a plurality of antennas.

Additionally, in order to facilitate the miniaturization of the electronic device, a mobile electronic device includes at least one antenna and utilizes a technique for using a plurality of frequency bands with the at least one antenna.

However, by transmitting and receiving using a plurality of frequency bands, the transmission (or reception) power of a signal in one frequency band may negatively affect a signal in another frequency band.

SUMMARY

Accordingly, an aspect of the present disclosure is to provide an electronic device for effectively using a plurality of antennas.

In accordance with an aspect of the present disclosure, an electronic device is provided, which includes an antenna; and a communication processor configured to transmit and receive a first signal corresponding to a first frequency band through the antenna, and to perform one of transmitting and receiving a second signal corresponding to a second frequency band through the antenna.

In accordance with another aspect of the present disclosure, an electronic device is provided, which includes a first antenna; a second antenna; and a communication processor configured to transmit a first signal corresponding to a first frequency band and a second signal corresponding to a second frequency band through the first antenna, and to receive the first signal and the second signal through the second antenna.

In accordance with another aspect of the present disclosure, an electronic device is provided, which includes a first antenna configured to use a common frequency band and a first frequency band; and a second antenna configured to use the common frequency band and a second frequency band. The first antenna uses a first transmission band transmission (Tx) and the second antenna uses a first band reception (Rx).

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION OF EMBODIMENTS OF THE DISCLOSURE

Figure 1:
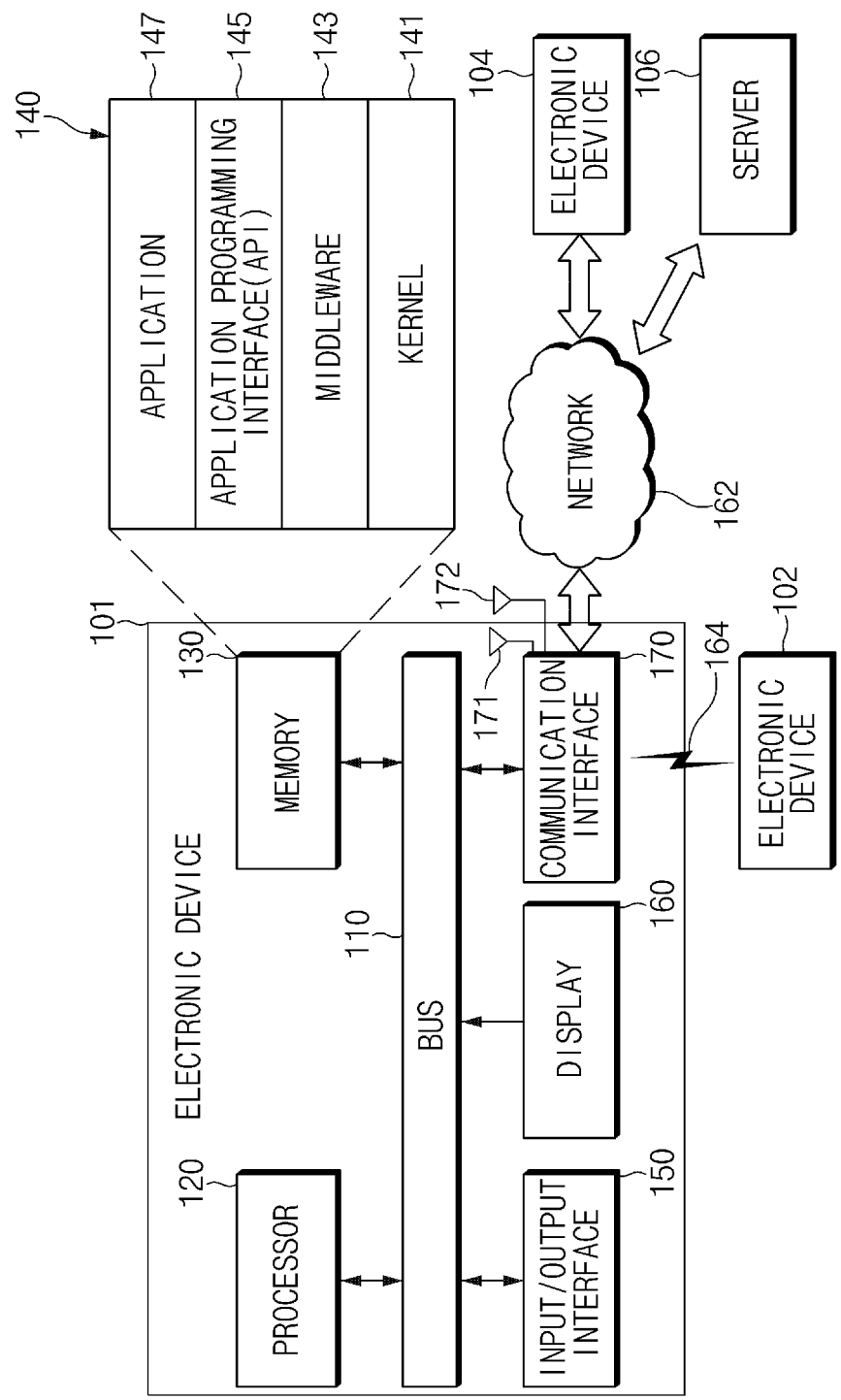
FIG. 1 illustrates an electronic device in a network environment according to an embodiment of the present disclosure.

Hereinafter, various embodiments of the present disclosure are described in detail with reference to the accompanying drawings. However, this description does not limit various embodiments of the present disclosure and it should be understood that the present disclosure covers all the modifications, equivalents, and/or alternatives of this disclosure which fall within the scope of the appended claims and their equivalents.

With respect to the descriptions of the drawings, like reference numerals may refer to like elements.

Terms in a singular form may include plural forms unless they have a clearly different meaning in the context.

Further, unless otherwise indicated herein, all the terms used herein, which include technical or scientific terms, may have the same meaning that is generally understood by a person skilled in the art. In general, the terms defined in a dictionary should be considered to have the same meaning as the applicable dictionary definition in the related art, and unless clearly defined herein, should not be understood abnormally or as having an excessively formal meaning.

The terms defined in this specification cannot be interpreted as excluding embodiments of the present disclosure.

The term "module" used in herein, may mean a unit including a combination of at least one of hardware, software, and firmware. The terms "module", "unit", "logic", "logical block", "component", and "circuit" may be used interchangeably.

A "module" may be a minimum unit or part of an integrally configured component or may be a minimum unit performing at least one function or part thereof.

A "module" may be implemented mechanically or electronically. For example, "module" may include at least one of an application-specific integrated circuit (ASIC) chip performing certain operations, field-programmable gate arrays (FPGAs), or a programmable-logic device, all of which are known or to be developed in the future. Herein, the terms "include," "comprise," "have", "may include," "may comprise" and "may have" indicate disclosed functions, operations, and/or existence of elements, but do not exclude other functions, operations, or elements.

The expressions "A or B" and "at least one of A or/and B" may indicate A, B, or both A and B. For example, the expressions "A or B" and "at least one of A or/and B" may indicate (1) at least one A, (2) at least one B, or (3) both at least one A and at least one B.

The terms such as "1st", "2nd", "first", "second", etc., as used herein, may be used to distinguish different elements from each other, but do not limit the elements. For example, "a first user device" and "a second user device" may indicate different user devices, regardless of an order or importance of the devices. Additionally, a first component may be referred to as a second component and vice versa, without departing from the scope of the present disclosure.

When a component (e.g., a first component) is referred to as being "(operatively or communicatively) coupled with/to" or "connected to" another component (e.g., a second component), the first component can be directly connected to the second component or indirectly connected through another component (e.g., a third component). However, when the first component is referred to as being "directly connected to" or "directly accessed by" the second component, the third component does not exist therebetween.

Herein, the expression "configured to" may be interchangeably used with "suitable for", "having the capacity to", "designed to", "adapted to", "made to", or "capable of" according to context.

Further, the term "configured to" may not necessarily mean "specifically designed to" in terms of hardware, but the expression "a device configured to" in some situations may mean that the device and another device or part are "capable of". For example, "a processor configured to perform A, B, and C" may mean a dedicated processor (e.g., an embedded processor) for performing a corresponding operation or a generic-purpose processor (e.g., a central processing unit (CPU) or an application processor) for performing corresponding operations by executing at least one software program stored in a memory device.

Electronic devices described in the embodiments of the present disclosure may include at least one of smartphones, tablet personal computers (PCs), mobile phones, video phones, electronic book (e-book) readers, desktop personal computers (PCs), laptop personal computers (PCs), netbook computers, workstation server, personal digital assistants (PDAs), portable multimedia player (PMPs), MP3 players, mobile medical devices, cameras, and wearable devices (e.g., smart glasses, head-mounted-devices (HMDs), electronic apparel, electronic bracelets, electronic necklaces, electronic appcessories, electronic tattoos, smart mirrors, and smart watches).

Electronic devices described in the embodiments of the present disclosure may also include smart home appliances using at least one antenna, such as televisions, digital video disk (DVD) players, audios, refrigerators, air conditioners, cleaners, ovens, microwave ovens, washing machines, air cleaners, set-top boxes, home automation control panels, security control panels, TV boxes (e.g., Samsung HomeSync®, Apple TV® or Google TV®), game consoles (e.g., Xbox® and PlayStation®), electronic dictionaries, electronic keys, camcorders, and electronic picture frames.

Electronic devices described in the embodiments of the present disclosure may also include flexible electronic devices using at least one antenna.

Further, electronic devices described in the embodiments of the present disclosure may include a combination of any of the above-described devices.

Additionally, an electronic device described in the embodiments of the present disclosure is not limited to the above-described devices and may include a new kind of an electronic device according to the development of technology.

Herein, the term "user" may refer to a person using an electronic device or a device using an electronic device (e.g., an artificial intelligence electronic device).

FIG. 1 illustrates an electronic device in a network environment according to an embodiment of the present disclosure.

Referring to FIG. 1, the electronic device 101 includes a bus 110, a processor 120, a memory 130, an input/output interface 150, a display 160, a communication interface 170, and a plurality of antennas 171 and 172. Alternatively, the electronic device 101 may omit at least one of the components or may additionally include a different component.

The bus 110 may include a circuit for connecting the components 110 to 170 to each other and delivering communication (e.g., a control message and/or data) between the components 110 to 170.

The processor 120 may include at least one of a CPU, an Application Processor (AP), and a communication processor (CP). The processor 120 may execute calculations or data processing for control and/or communication of at least one another component of the electronic device 101.

The memory 130 may include volatile and/or nonvolatile memory. The memory 130 may store instructions or data relating to at least one another component of the electronic device 101. As illustrated in FIG. 1, the memory 130 stores software and/or a program 140, which includes a kernel 141, a middleware 143, an application programming interface (API) 145, and an application program (or an application) 147. At least part of the kernel 141, the middleware 143, and the API 145 may be referred to as an operating system (OS).

The kernel 141 may control or manage system resources (e.g., the bus 110, the processor 120, the memory 130, etc.) used for performing operations or functions implemented in other programs (e.g., the middleware 143, the API 145, or the application program 147). Additionally, the kernel 141 may provide an interface for controlling or managing system resources by accessing an individual component of the electronic device 101 from the middleware 143, the API 145, or the application program 147.

The middleware 143 may serve as an intermediary for exchanging data as the API 145 or the application program 147 communicates with the kernel 141. Additionally, in relation to job requests received from the application program 147, the middleware 143 may perform a control (e.g., scheduling or load balancing) for the job requests by assigning a priority for using a system resource (e.g., the bus 110, the processor 120, the memory 130, etc.) of the electronic device 101 to at least one application program among the application programs 147.

The API 145, which acts as an interface for allowing the application 147 to control a function provided from the kernel 141 or the middleware 143, may include at least one interface or function (e.g., an instruction) for file control, window control, image processing, character control, etc.

The input/output interface 150 may serve as an interface for delivering instructions or data inputted from a user or another external device to other components of the electronic device 101. Additionally, the input/output interface 150 may output instructions or data received from other components of the electronic device 101 to a user or another external device.

The display 160 may include a liquid crystal display (LCD), a light emitting diode (LED) display, an organic light emitting diode (OLED) display, a microelectromechanical systems (MEMS) display, or an electronic paper display. The display 160 may display various contents (e.g., text, image, video, icon, symbol, etc.) to a user. The display 160 may include a touch screen that receives a touch input, a gesture input, a proximity input, and/or a hovering input from an electronic pen or a user body part.

The communication interface 170 may set a communication between the electronic device 101 and an external device (e.g., a first external electronic device 102, a second external electronic device 104, or a server 106). For example, the communication interface 170 may communicate with the second external electronic device 104 or the server 106 through a network 162 using wireless communication or wired communication. Additionally, the communication interface 170 may directly communicate with the first external electronic device 102 through short range communication 164, e.g., Bluetooth (BT)® or Near Field Communication (NFC)®.

For example, the wireless communication may use long term evolution (LTE)®, LTE-Advanced (LTE-A)®, code division multiple access (CDMA), wideband CDMA (WCDMA), universal mobile telecommunications system (UMTS), wireless broadband (WiBro), or global system for mobile communications (GSM)® as a cellular communication protocol. The wired communication may include universal serial bus (USB), high definition multimedia interface (HDMI)®, recommended standard 232 (RS-232), and/or plain old telephone service (POTS).

The network 162 may include a telecommunications network, a computer network (for example, a local area network (LAN) or wide area network (WAN)), Internet, and/or a telephone network.

Each of the first and second external electronic devices 102 and 104 may be the same or different type of the electronic device 101.

The server 106 may include a group of servers.

A part of the operations described herein as being executed on the electronic device 101 may be executed on another electronic device (e.g., the electronic device 102, the electronic device 104 and/or the server 106).

When the electronic device 101 performs a certain function, it may request at least part of a function relating thereto from another electronic device 102 or 104, or the server 106 instead of or in addition to executing the function or service by itself. The other electronic devices may execute the requested function or an additional function and deliver an execution result to the electronic device 101.

The electronic device 101 may provide the requested function or service as it is received or by performing additional processing on the received result. For example, cloud computing, distributed computing, or client-server computing technology may be used.

The electronic device 101 may further include an antenna and the communication interface 170 may set a communication between the electronic device 101 and the first external electronic device 102, the second external electronic device 104, or the server 106, by the antenna.

Figure 2:
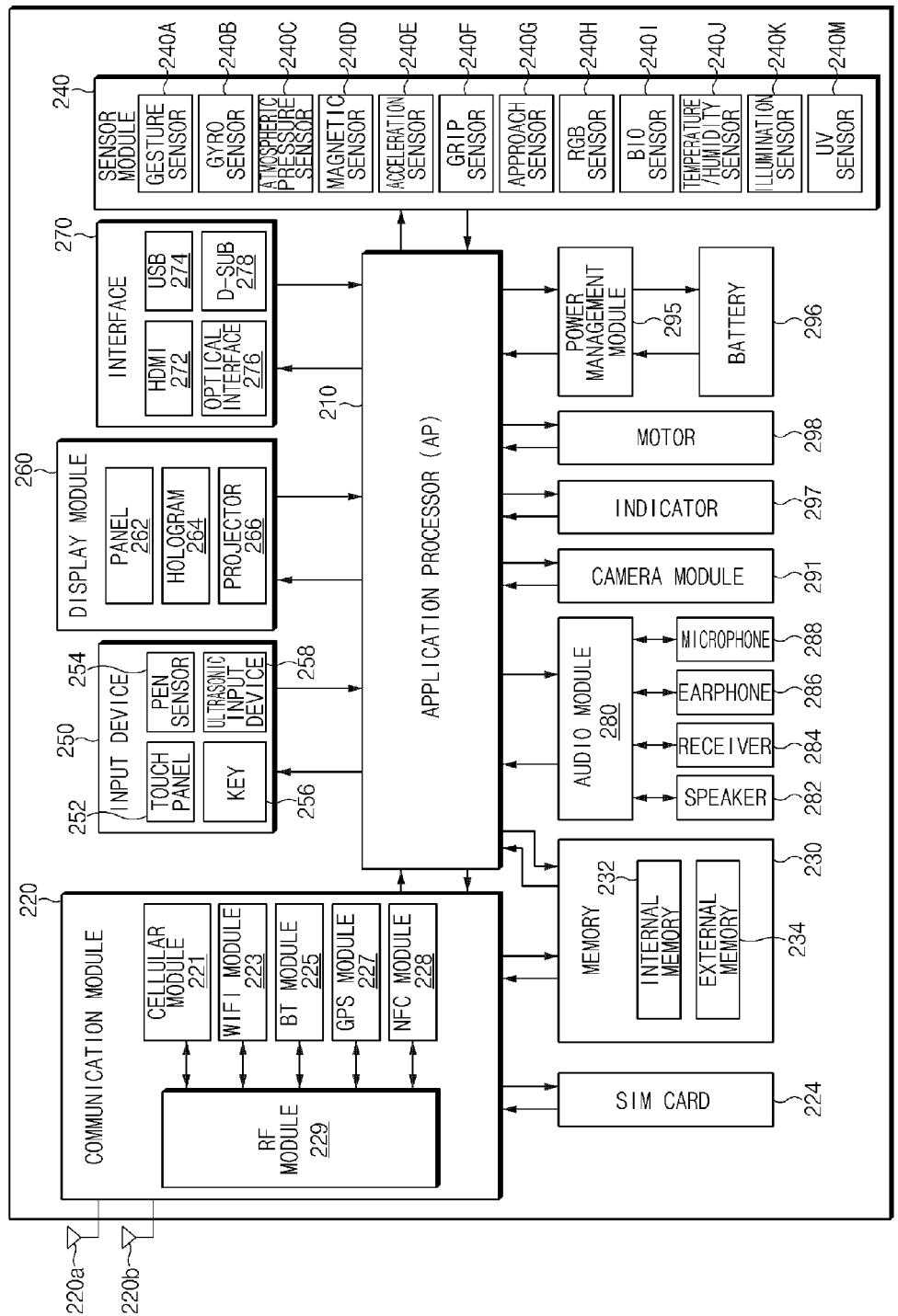
FIG. 2 illustrates an electronic device according to an embodiment of the present disclosure.

FIG. 2 illustrates an electronic device according to an embodiment of the present disclosure.

Referring to FIG. 2, the electronic device includes an application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may control a plurality of hardware or software components connected to the AP 210 and may also perform various data processing and operations by executing an OS or an application program. For example, the AP 210 may be implemented with a system on chip (SoC). The AP 210 may further include a graphic processing unit (GPU) and/or an image signal processor.

Alternatively, the AP 210 may also include at least part of the other components illustrated in FIG. 2 (e.g., the cellular module 221).

The AP 210 may load and process commands or data received from at least one of other components. Further, the AP 210 may store various data in a nonvolatile memory.

The communication module 220 may have a same or similar configuration to the communication interface 170 illustrated in FIG. 1.

The communication module 220 includes a cellular module 221, a WiFi module 223, a BT® module 225, a global positioning system (GPS) module 227, an NFC® module 228, an RF module 229, and a plurality of antennas 220a and 220b.

The cellular module 221 may provide voice call, video call, text service, or Internet service through a communication network. The cellular module 221 may perform a distinction and authentication operation on the electronic device in the communication network by using a subscriber identification module (e.g., the SIM card 224). The cellular module 221 may perform at least part of a function that the AP 210 provides. The cellular module 221 may further include a communication processor (CP).

Each of the WiFi® module 223, the BT® module 225, the GPS module 227, and the NFC® module 228 may include a processor for processing data transmitted/received through a corresponding module. At least one of the cellular module 221, the WiFi® module 223, the BT® module 225, the GPS module 227, and the NFC® module 228 may be included in an integrated chip (IC) or IC package.

The RF module 229 may transmit/receive communication signals (e.g., RF signals). The RF module 229 may include a transceiver, a power amp module (PAM), a frequency filter, a low noise amplifier (LNA), or an antenna.

At least one of the cellular module 221, the WiFi® module 223, the BT® module 225, the GPS module 227, and the NFC® module 228 may transmit/receive RF signals through a separate RF module.

The SIM card 224 may include a SIM and/or an embedded SIM and also may include unique identification information (e.g., an integrated circuit card identifier (ICCID)) or subscriber information (e.g., an international mobile subscriber identity (IMSI)).

The memory 230 includes an internal memory 232 and an external memory 234.

The internal memory 232 may include at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory, such as NAND flash or NOR flash, a hard drive, and a solid state drive (SSD)).

The external memory 234 may include a flash drive such as a compact flash (CF), a secure digital (SD), a micro Micro-SD, a Mini-SD, an extreme digital (xD), or a memorystick. The external memory 234 may be functionally and/or physically connected to the electronic device through various interfaces.

The sensor module 240 measures physical quantities or detects an operating state of the electronic device, thereby converting the measured or detected information into electrical signals. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and an ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infra red (IR) sensor, an iris sensor, or a fingerprint sensor.

The sensor module 240 may further include a control circuit for controlling at least one of the sensors therein.

The electronic device may further include a processor configured to control the sensor module 240 as part of or separately from the AP 210, and thus, may control the sensor module 240, while the AP 210 is in a sleep state.

The input device 250 includes a touch panel 252, a (digital) pen sensor 254, a key 256, and an ultrasonic input device 258.

The touch panel 252 may use at least one of capacitive, resistive, infrared, or ultrasonic methods. Additionally, the touch panel 252 may further include a control circuit and a tactile layer to provide tactile response to a user.

The (digital) pen sensor 254 may include a sheet for recognition as part of a touch panel or a separate sheet for recognition.

The key 256 may include a physical button, an optical key, or a keypad.

The ultrasonic input device 258 may check data by detecting sound waves through a microphone 288 through an input tool generating ultrasonic signals.

The display 260 includes a panel 262, a hologram device 264, and a projector 266. For example, the panel 262 may have a same or similar configuration to the display 160 illustrated in FIG. 1.

The panel 262 may be implemented to be flexible, transparent, or wearable.

The panel 262 and the touch panel 252 may be configured with one module.

The hologram 264 may show three-dimensional images in the air by using the interference of light.

The projector 266 may display an image by projecting light on a screen. The screen, for example, may be placed inside or outside the electronic device.

The display 260 may further include a control circuit for controlling the panel 262, the hologram device 264, and/or the projector 266.

The interface 270 includes an HDMI 272, a USB 274, an optical interface 276, and a D-subminiature (sub) 278. Additionally or alternatively, the interface 270 may include a mobile high-definition link (MHL) interface, a secure Digital (SD) card/multimedia card (MMC) interface, and/or an infrared data association (IrDA) standard interface.

The audio module 280 may convert sound into electrical signals and convert electrical signals into sounds. The audio module 280 may process sound information input/output through a speaker 282, a receiver 284, an earphone 286, or the microphone 288.

The camera module 291, which captures still images and video, may include at least one image sensor (for example, a front sensor or a rear sensor), a lens, an image signal processor (ISP), or a flash (for example, an LED or a xenon lamp).

The power management module 295 may manage the power of the electronic device. The power management module 295 may include a power management IC (PMIC), a charger IC, and a battery gauge. The PMIC may use a wired and/or wireless charging method, for example, a magnetic resonance method, a magnetic induction method, or an electromagnetic method.

An additional circuit for wireless charging, for example, a circuit such as a coil loop, a resonant circuit, or a rectifier circuit, may also be added.

The battery gauge may measure the remaining amount of the battery 296, or a voltage, current, or temperature thereof during charging.

The battery 296, for example, may include a rechargeable battery and/or a solar battery.

The indicator 297 may display a specific state of the electronic device or part thereof (e.g., the AP 210), such as a booting state, a message state, or a charging state.

The motor 298 may convert electrical signals into mechanical vibration and may generate vibration or haptic effect.

Although not illustrated in FIG. 2, the electronic device may include a processing device (for example, a GPU) for mobile TV support. A processing device for mobile TV support may process media data according to the standards such as digital multimedia broadcasting (DMB), digital video broadcasting (DVB), or mediaFLO.

Each of the above-mentioned components of the electronic device may be configured with at least one component, and the name of a corresponding component may vary according to the type of the electronic device.

Alternatively, the electronic device may not include some of the above-mentioned components, or may further include another component. Additionally, some of components in an electronic device may be configured as one component (or entity), in which functions of the combined components are performed identically.

The electronic device of FIG. 2 includes antennas 220a and 220b. The antennas 220a and 220b may be provided in each of the cellular module 221, the WiFi® module 223, the BT® module 225, the GPS module 227, and the NFC® module 228. Additionally, the AP 210 or the communication module 220 may apply carrier aggregation (CA) technology to a plurality of signals transmitted/received through different frequency bands, by using the antennas 220a and 220b.

Even when using a plurality of frequency bands with one antenna, the electronic device may apply CA technology to signals in different frequency bands by using a duplexer and/or a diplexer. In such a case, the electronic device may support all frequency bands that the electronic device supports, with one RF path.

According to an embodiment of the present disclosure, in order to distinguish signals transmitted/received through a frequency band of a different communication method, the electronic device may include a distinguished communication circuit based on a frequency band of a different communication method.

An LTE communication method may be configured with a plurality of frequency bands and a frequency band supported by each country or each carrier may vary. Accordingly, when an electronic device uses one antenna, one RF path corresponding to the one antenna is required to support at least ten frequency bands. However, in such a case, a power delivered for Tx of a specific frequency band may affect an adjacent another frequency band.

Figure 3:
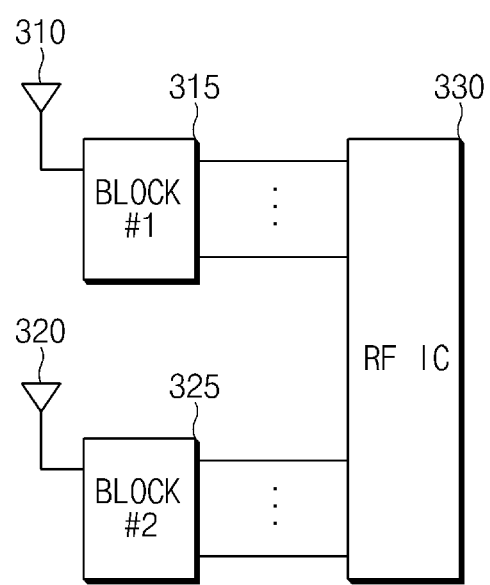
FIG. 3 illustrates an electronic device using two antennas according to an embodiment of the present disclosure.

FIG. 3 illustrates an electronic device according to an embodiment of the present disclosure.

Referring to FIG. 3, the electronic device 300 may include a first antenna 310, a first block 315, e.g., a first RF module, a second antenna 320, a second block 325, e.g., a second RF module, and an RF IC 330, e.g., a communication processor.

Each of the first antenna 310 and the second antenna 320 may support a specific frequency band based on an antenna structure, antenna type, and/or design. For example, the first antenna 310 may communicate through a first frequency band, and the second antenna 320 may communicate through a second frequency band.

Each of the allocated frequency bands (e.g., the first frequency band and the second frequency band) may include an overlapping common frequency band. For example, when the first antenna 310 uses 700 MHz to 1800 MHz and the second antenna 320 uses 1500 MHz to 2700 MHz, the overlapping common frequency band is 1500 MHz to 1800 MHz.

Herein, for a specified signal corresponding to a specified frequency band, the electronic device 300 may transmit the specified signal through the first antenna 310 and may also receive the specified signal through the second antenna 320 because the transmission frequency band and the reception frequency band of the specified signal are different in the specified frequency band. For example, in an LTE band, the transmission frequency band of a first band may be about 1920 MHz to about 1980 MHz and the reception frequency band of the first band may be about 2100 MHz to about 2170 MHz.

The first antenna 310 may support a transmission (Tx) signal in the specific frequency band and the second antenna 320 may support a reception (Rx) signal in the specific frequency band.

When one antenna is used, Tx and Rx of a specific frequency band are separated through a duplexer. However, when using two antennas, without a duplexer, one the antennas (e.g., the first antenna 310) may use Tx of the specific frequency band and the other antenna (e.g., the second antenna 320) may use Rx of the specific frequency band. Tx and/or Rx of the specific frequency band may be included in the common frequency band.

As described above, Tx and Rx of each of a plurality of frequency bands are divided by a plurality of antennas. For example, the first antenna 310 may use Tx of the first band and Tx of the second band, and the second antenna 320 may use Rx of the first band and Rx of the second band. Alternatively, the first antenna 310 may use Rx of the first band and Rx of the second band, and the second antenna 320 may use Tx of the first band and Tx of the second band.

As described above, each of the first antenna 310 and the second antenna 320 may be implemented to use a plurality of bands, instead of using only one frequency band. Accordingly, a first block 315 and a second block 325 may separately divide a plurality of frequency bands used in the first antenna 310 and the second antenna 320, and may separate Tx and Rx of a plurality of frequency bands. Accordingly, the first block 315 and the second block 325 may each include at least one switch, filter, duplexer, diplexer, and power amplifier module (PAM).

Herein, it is assumed that the first antenna 310 uses a first band Tx, a first band Rx, a second band Tx, a second band Rx, and a third band Tx, and that the second antenna 320 uses a third band Rx, a fourth band Tx, a fourth band Rx, a fifth band Tx, and a fifth band Rx. The first block 315 may include a diplexer for separating the first band and the second band, a duplexer for separating Tx and Rx of the first band, and a duplexer for separating Tx and Rx of the second band. Similar to the first block 315, the second block 325 also may include a diplexer for separating the fourth band and the fifth band, a duplexer for separating Tx and Rx of the fourth band, and a duplexer for separating Tx and Rx of the fifth band. However, the devices included in the first block 315 and the second block 325 are not limited to the examples above.

Unlike an electronic device using a single antenna, the electronic device 300 using the first antenna 310 and the second antenna 320 does not require a duplexer for to separating Tx and Rx of the third band. Further, by not including a duplexer, the electronic device 300 may reduce duplexer insertion loss (e.g., about 3 dB), and by separating Tx and Rx of a specific band, may enhance isolation between Tx and Rx.

Conventionally, because an Rx signal is affected by a Tx signal, the sensitivity of the Rx signal can be deteriorated. Additionally, because the power of the Tx signal is limited, in order to reduce the sensitivity deterioration of Rx signal, if one antenna is used, it may affect both the Tx signal and the Rx signal.

The RF IC 330 may apply CA technology to at least part of Tx and Rx of each separated band through the first block 315 or the second block 325. For example, the RF IC 330 may apply CA technology to the third Tx band and another Tx band, or may apply CA technology to the third Rx band and another Rx band. In this case, the third Tx band and another Tx band with the CA technology applied may be adjacent to each other.

Similarly, the third Rx band and another Rx band with the CA technology applied may be adjacent to each other. In each of these cases, another Tx band and another Rx band with the CA technology applied may be the same band.

Because the CA technology uses both Tx and Rx, at least one Rx band may be used in order to apply the CA technology to the above-mentioned third Tx band and other Tx band. Additionally, at least one Tx band may be used to apply the CA technology to the third Rx band and another Rx band.

The RF IC 330 may freely combine each of Tx and Rx of a plurality of bands and apply the CA technology thereto. For example, the RF IC 330 may apply the CA technology to the third Tx band and another Tx band, and to the third Rx band and another Rx band.

The RF IC 330, for example, may include a configuration that is identical or similar to that of the processor 120 illustrated in FIG. 1 or a communication processor (CP) of the cellular module 210 illustrated in FIG. 2.

Figure 4:
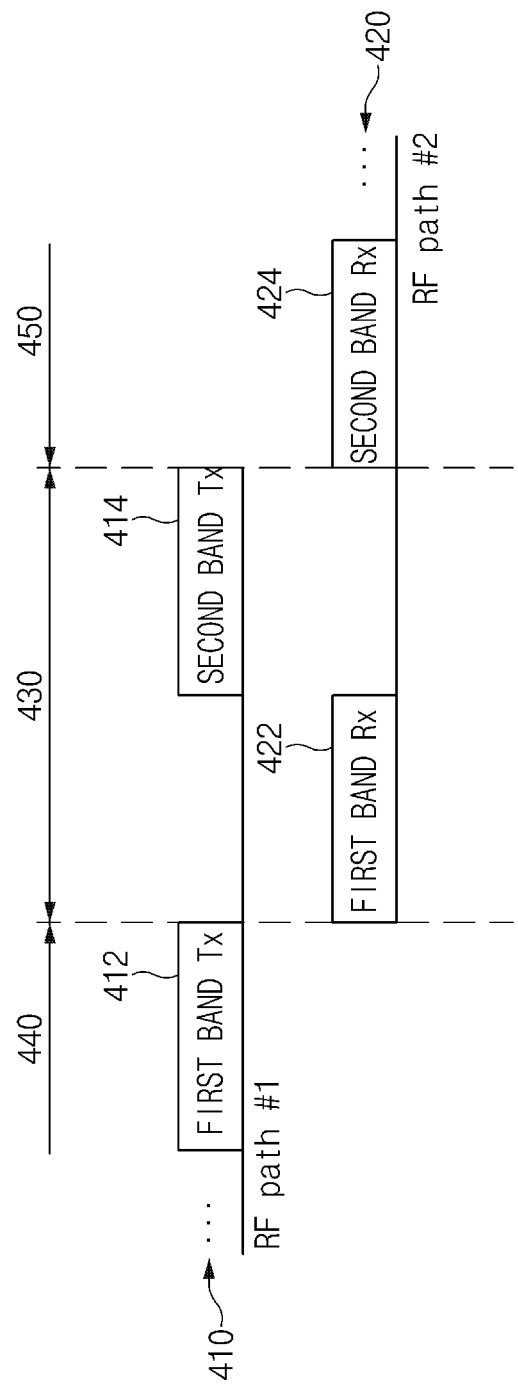
FIG. 4 illustrates radio frequency (RF) paths corresponding to a first antenna and a second antenna according to an embodiment of the present disclosure.

FIG. 4 illustrates RF paths corresponding to a first antenna and a second antenna, according to an embodiment of the present disclosure.

Referring to FIG. 4, the first antenna uses a common frequency band 430 and a first frequency band 440. An RF path 410 corresponding to the first antenna includes a first band Tx 412, a second band Tx 414, and another band of a lower frequency than the first band Tx 412. The RF path 410 may include both Tx and Rx frequency bands lower than the first band Tx 412.

Similarly, the second antenna uses the common frequency band 430 and a second frequency band 450. An RF path 420 corresponding to the second antenna includes the first band Rx 422, the second band Rx 424, and another band of a higher frequency than the second band Rx 424. The RF path 420 may include both Tx and Rx frequency bands higher than the second band Rx 424.

Referring to FIG. 4, the first antenna uses the first band Tx 412 and the second antenna uses the first band Rx 422. Additionally, in the common frequency band 430, the first antenna uses the second band Tx 414 and the second antenna uses the second band Rx 424. Accordingly, the electronic device does not require a duplexer for separating the first band Tx 412 and the first band Rx 422 or a duplexer for separating the second band Tx 414 and the second band Rx 424. Therefore, the electronic device illustrated in FIG. 3 reduces duplexer insertion loss and enhances isolation in order to improve RF performance. The improvement of the RF performance may be obtained by applying the CA technology to each of the separated frequency bands Tx and RX.

In order to apply the CA technology, the first band Rx 422 and the second band Rx 424, which are received by the second antenna, should be separated from each other. Accordingly, the electronic device may further include a separation device (e.g., a dual saw filter) for separating the signals. Because the electronic device uses a plurality of antennas, in order to apply the CA technology, in contrast to using a single antenna, the electronic device is not required to use a combination of a diplexer for separating signals in high/low frequency bands and a duplexer for separating Tx and Rx in a band. Consequently, insertion loss can be reduced and isolation can be enhanced.

When the CA technology is not applied, the electronic device may selectively use the first band Rx 422 and the second band Rx 424 through a switch.

Figure 5:
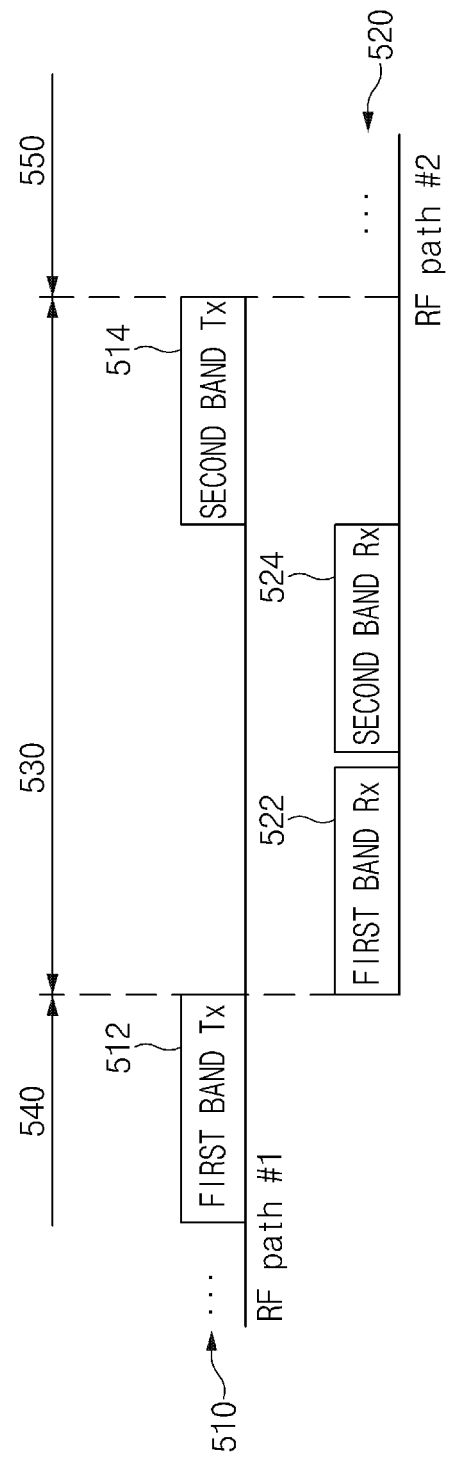
FIG. 5 illustrates RF paths corresponding to a first antenna and a second antenna according to an embodiment of the present disclosure.

FIG. 5 illustrates RF paths corresponding to a first antenna and a second antenna, according to an embodiment of the present disclosure.

Referring to FIG. 5, the first antenna uses a common frequency band 530 and a first frequency band 540. An RF path 510 corresponding to the first antenna includes a first band Tx 512, a second band Tx 514, and another band of a lower frequency than the first band Tx 512. The RF path 510 may include both Tx and Rx frequency bands lower than the first band Tx 512.

Similarly, the second antenna uses the common frequency band 530 and a second frequency band 550. An RF path 520 corresponding to the second antenna includes the first band Rx 522, the second band Rx 524, and another band of a higher frequency than the second band Rx 524. The RF path 520 may include both Tx and Rx frequency bands higher than the second band Rx 524.

Referring to FIG. 5, the first antenna uses the first band Tx 512 and the second antenna uses the first band Rx 522. Additionally, the first antenna uses the second band Tx 514 and the second antenna uses the second band Rx 524. Accordingly, the electronic device in FIG. 5 does not require a duplexer for separating the first band Tx 512 and the first band Rx 522, or a duplexer for separating the second band Tx 514 and the second band Rx 524. Therefore, the electronic device illustrated in FIG. 5 also reduces insertion loss and enhances isolation to improve RF performance.

In order to apply the CA technology, the electronic device of FIG. 5 may further include a separation device (e.g., a dual saw filter) for separating the first band Rx 522 from the second band Rx 524, which are received by the same second antenna. However, unlike the electronic device illustrated FIG. 4, because the first band Rx 522 and the second band Rx 524 used by the second antenna are adjacent to each other, the electronic device of FIG. 5 may further include a separation device (e.g., a dual saw filter) for separating the first band Rx 522 from the second band Rx 524. By including a separation device, the electronic device of FIG. 5 may receive the first band Rx 522 and the second band Rx 524 at the same time and may apply the CA technology.

Additionally, when the CA technology is not applied, the electronic device may selectively use the first band Rx 522 and the second band Rx 524 through a switch.

Figure 6A:
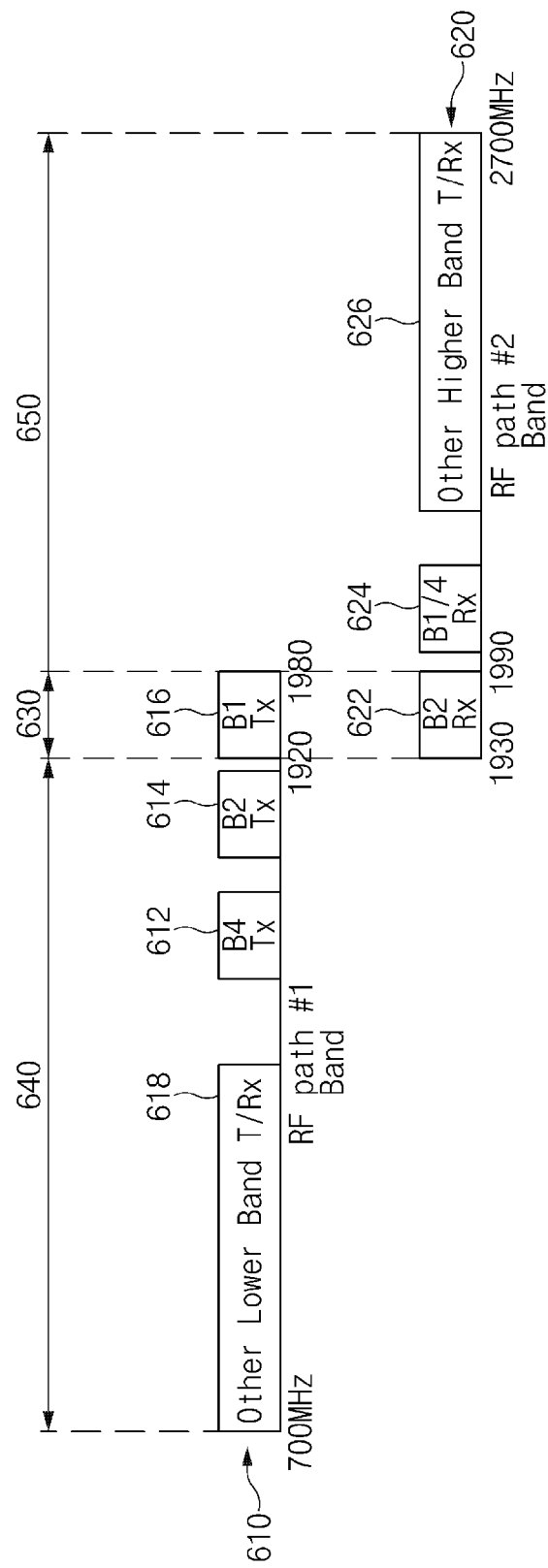
FIG. 6A illustrates RF paths corresponding to a first antenna and a second antenna according to an embodiment of the present disclosure.

FIG. 6A illustrates RF paths corresponding to a first antenna and a second antenna, according to an embodiment of the present disclosure. Specifically, FIG. 6A illustrates an example utilizing a usable LTE band.

When an electronic device uses one antenna, a circuit configuration for supporting the CA of an adjacent frequency band may be inefficient. For example, using an LTE band 2 and an LTE band 4, because the LTE band 2 is disposed between the Tx band and the Rx band of the LTE band 4, it is difficult to obtain a CA configuration with a combination of a diplexer for separating low/high band signals on a conventionally used frequency and a duplexer for separating a Tx signal from an Rx signal in a band.

Referring to FIG. 6A, the first antenna uses a common frequency band 630 and a first frequency band 640. An RF path 610 corresponding to the first antenna includes an LTE band 4 Tx 612, an LTE band 2 Tx 614, an LTE band 1 Tx 616, and a frequency band Tx and Rx 618, which is lower than the LTE band 4 Tx 612.

The second antenna uses the common frequency band 630 and a second frequency band 650. An RF path 620 corresponding to the second antenna includes an LTE band 2 Rx 622, an LTE band 1 and LTE band 4 Rx 624, and a higher frequency band Tx and Rx 626, which is higher than the LTE band 1 and LTE band 4 Rx 624. Because the LTE band 1 Rx is 2110 MHz to 2170 MHz and the LTE band 4 Rx is 2110 MHz to 2155 MHz, the LTE band 1 and LTE band 4 Rx are illustrated as one band. 1920 MHz to 1980 MHz is allocated to the LTE band 1 Tx 616 and 1930 MHz to 1990 MHz is allocated to the LTE band 2 Rx 622. Accordingly, the common frequency band 630 includes the LTE band 1 Tx 616 and the LTE band 2 Rx 622, as 1920 MHz and 1990 MHz.

In order to apply the CA technology, the electronic device of FIG. 6A may further include a separation device (e.g., a dual saw filter) for separating the LTE band 2 Rx 622 from the LTE band 1 or 4 Rx 624, which are received by the same second antenna.

For example, unlike the electronic device illustrated FIG. 4, because the second band Rx 622 and the LTE band 1 or 4 Rx 624 used by the second antenna are adjacent to each other, the electronic device of FIG. 6A may further include a separation device for separating the second band Rx 622 from the LTE band 1 or 4 Rx 624. By further including the separation device, the electronic device of FIG. 6A may receive the second band Rx 622 and the LTE band 1 or 4 Rx 624 at the same time and may apply the CA technology.

Additionally, when the CA technology is not applied, the electronic device may selectively use the second band Rx 622 and the LTE band 1 or 4 Rx 624 through a switch.

Because an effect of the electronic device of FIG. 6A not including a duplexer is similar to that described for the electronic devices of FIGS. 4 and 5, a redundant description is omitted.

As illustrated in FIGS. 4 to 6A, in relation to the common frequency area, one of the two antennas may use an arbitrary frequency band Tx and the other antenna may use an arbitrary frequency band Rx. The arbitrary frequency bands may be different or identical frequency bands.

The electronic device may also differently set a common frequency area according to a frequency band that the CA technology is to be applied.

Although not illustrated in FIG. 6A, it is assumed that the electronic device of FIG. 6A supports an LTE band 3.

1710 MHz to 1785 MHz may be allocated to the LTE band 3 Tx and 1805 MHz to 1880 MHz may be allocated to the LTE band 3 Rx. Additionally, 1850 MHz to 1910 MHz may be allocated to the LTE band 2 Tx 614 and 1710 MHz to 1755 MHz may be allocated to the LTE band 4 Tx 612. Accordingly, the electronic device of FIG. 6A may set a common frequency area with 1805 MHz to 1990 MHz in order to apply the CA technology to the LTE band 3.

Figure 6B:
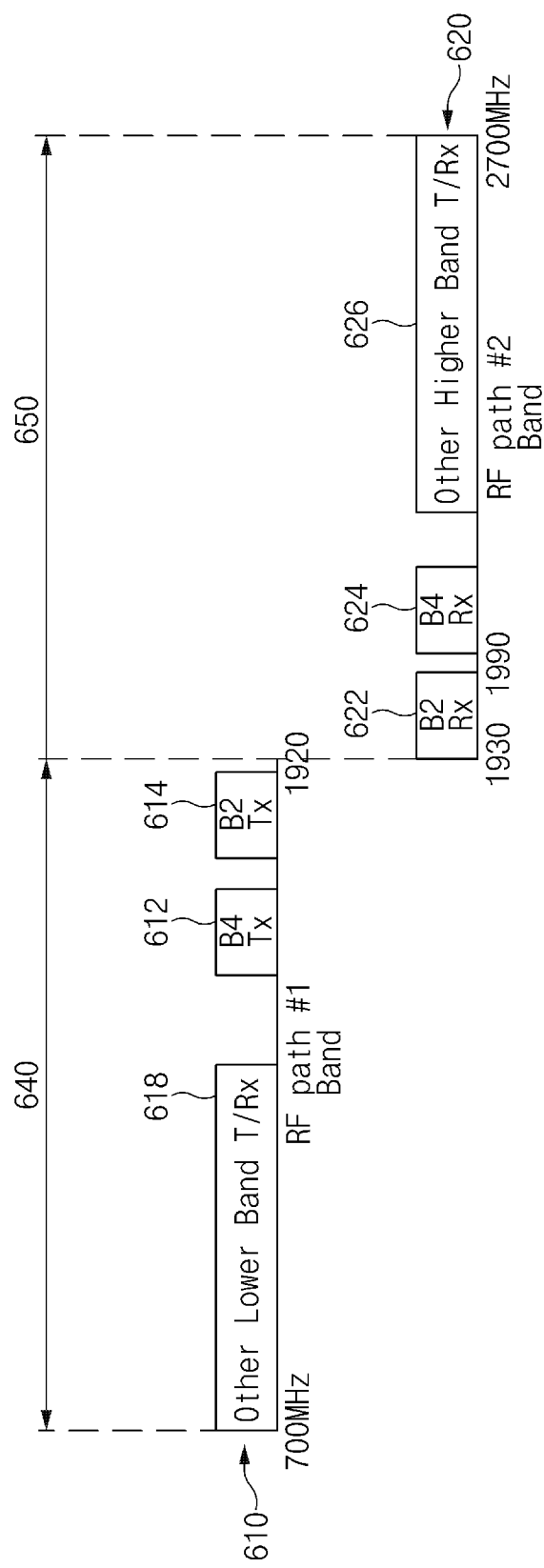
FIG. 6B illustrates RF paths corresponding to a first antenna and a second antenna according to an embodiment of the present disclosure.

FIG. 6B illustrates RF paths corresponding to a first antenna and a second antenna, according to an embodiment of the present disclosure. In comparison to FIG. 6A, the electronic device of FIG. 6B does not support an LTE band 1, and there may be no common frequency band 630, as illustrated in FIG. 6A, between the RF path 610 corresponding to the first antenna and the RF path 620 corresponding to the second antenna.

In this case, even when a common frequency band is not included in each frequency band supported by the first antenna and the second antenna, a technique for is applying CA to a signal between adjacent bands as described with reference to FIGS. 4 to 6A may be implemented.

Figure 7A:
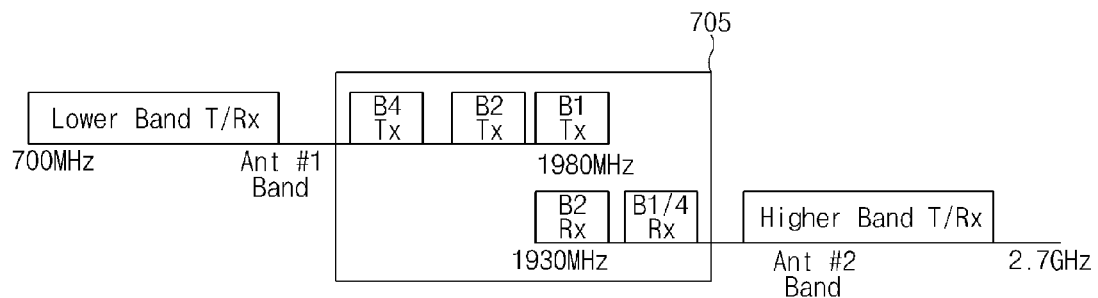
FIG. 7A illustrates an electronic device using two antennas according to an embodiment of the present disclosure.
Figure 7A:
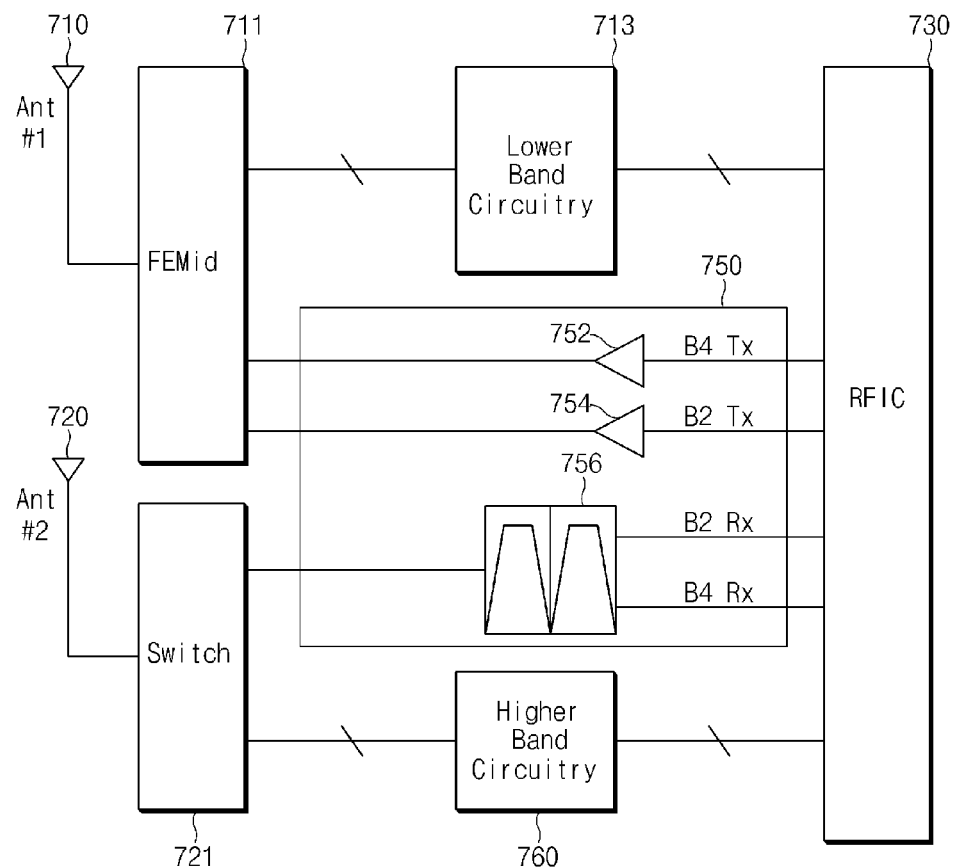

FIG. 7A illustrates an electronic device using two antennas according to an embodiment of the present disclosure.

Referring to FIG. 7A, the electronic device includes a first antenna 710, a second antenna 720, an RF IC 730, a front end module and integrated duplexer (FEMid) 711, a switch (e.g., a single pole double throw (SPDT)) 721, a first block 740 for processing signals in a low frequency band, a second block 750 for processing signals in a common frequency band 705, and a third block 760 for processing signals in a high frequency band.

The FEMid 711 and the RFIC 730 may transmit an LTE band 2 Tx and an LTE band 4 Tx through the first antenna 710 by using the respective PAs 752 and 754 of the second block 750. Additionally, the switch 721 and the RFIC 730 may separate the LTE band 2 Rx from the LTE band 4 Rx, which are received through the second antenna 720, by using a dual saw filter 756.

Accordingly, the RF IC 730 may apply the CA technology to high frequency bands like the LTE bands 2 and 4.

Figure 7B:
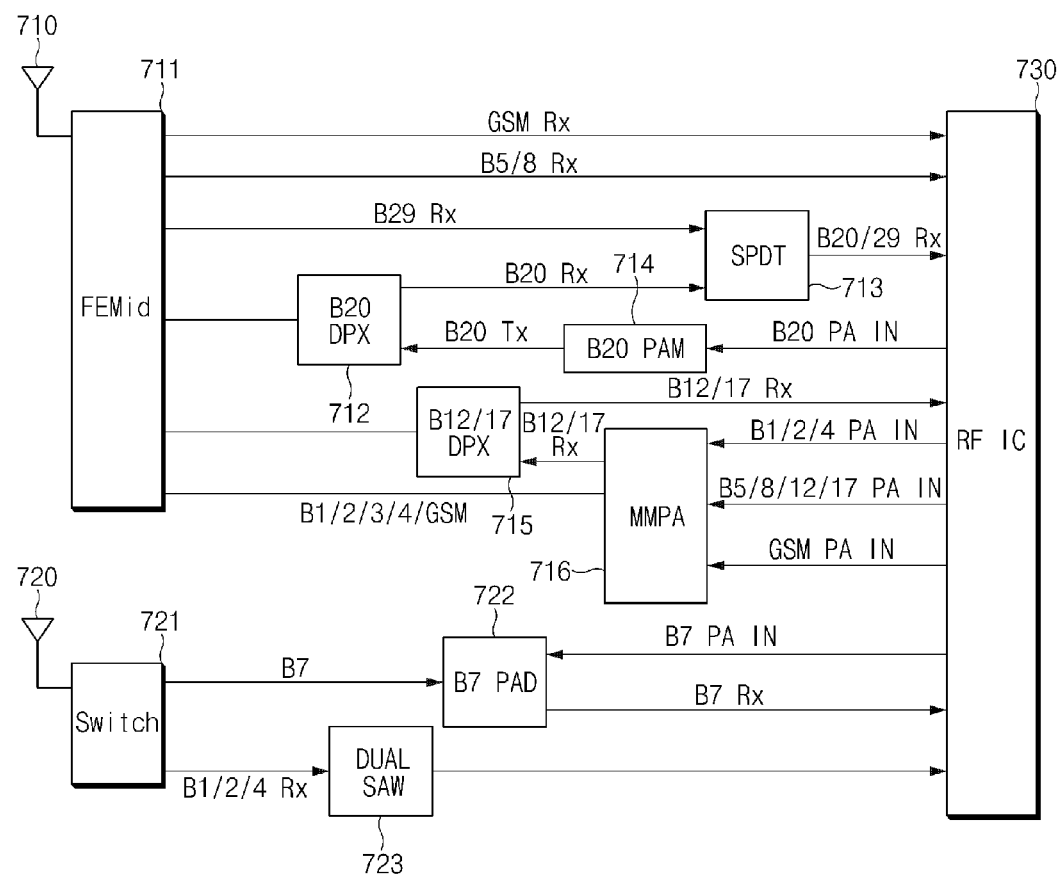
FIG. 7B illustrates an electronic device using two antennas according to an embodiment of the present disclosure.

FIG. 7B illustrates an electronic device using two antennas according to various embodiments of the present disclosure.

Referring to FIG. 7B, the electronic device includes a first antenna 710, a second antenna 720, an RF IC 730, an FEMid 711, a first duplexer 712, a first switch (e.g., an SPDT) 713, a PAM 714, a second duplexer 715, a multi-mode multi-band power amplifier (MMPA) 716, a second switch 721, a power amplifier duplexer (PAD) 722, and a dual saw filter 723.

The first antenna 710 may use Tx and Rx of GSM; Tx and Rx of each of LTE bands 5, 8, 12, 17, and 20; Rx of an LTE band 29; and Tx of LTE bands 1, 2, and 4. The Tx and Rx of GSM and the Tx and Rx of each of the LTE bands 5, 8, 12, 17, and 20 may be separated through the blocks 711, 712, and 715.

The second antenna 720 may use the Tx and Rx of the LTE band 7 and the RX of each of the LTE bands 1, 2, and 4. The Tx and Rx of the LTE band 7 may be separated through the PAD 722.

Additionally, the Rx of each of the LTE bands 1, 2, and 4 may be divided into the RX of the LTE band 2 and the Rx of the LTE bands 1 and 4 through the dual saw filter 723. Herein, the second switch 721 may be for selectively connecting the Tx and Rx of the LTE band 7 in high frequency to other bands in relatively low frequency. Accordingly, the RF IC 730 may apply the CA technology to high frequency bands like the LTE bands 2 and 4.

Figure 8:
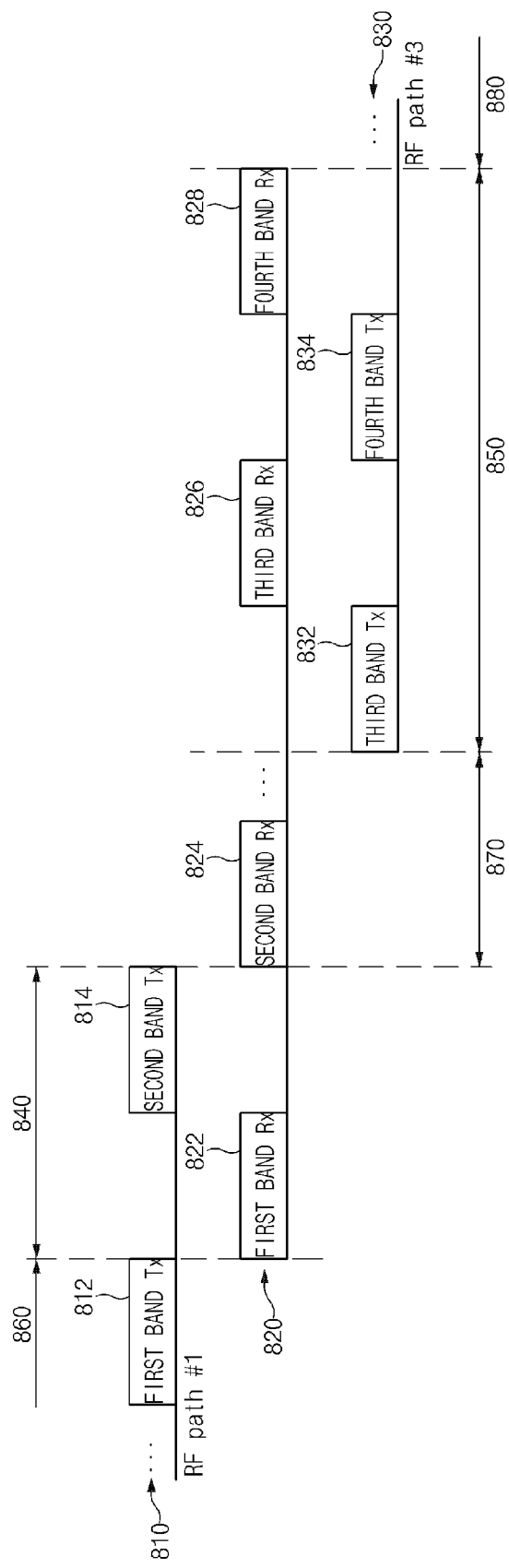
FIG. 8 illustrates RF paths corresponding to a first antenna, a second antenna, and a third antenna according to an embodiment of the present disclosure.

FIG. 8 illustrates RF paths corresponding to a first antenna, a second antenna, and a third antenna, according to an embodiment of the present disclosure.

Referring to FIG. 8, the first antenna uses a first common frequency band 840 and a first frequency band 860. An RF path 810 corresponding to the first antenna includes a first band Tx 812, a second band Tx 814, and another band of a lower frequency than the first band Tx 812.

The second antenna uses the first common frequency band 840, a second frequency band 850, and a second frequency band 870. An RF path 820 corresponding to the second antenna includes the first band Rx 822, the second band Rx 824, the third band Rx 826, and the fourth band Rx 828.

Additionally, the third antenna uses the second common frequency band 850 and the third frequency band 880. An RF path 830 corresponding to the third antenna includes a third band Tx 832, a fourth Tx 834, and another band of a higher frequency than the fourth band Tx 834.

The electronic device of FIG. 8 may obtain the above-described effects, by not including a duplexer for separating Tx and Rx of each of the first band to fourth band.

According to various embodiments of the present disclosure, an electronic device may include a first antenna using a common frequency band and a first frequency band and a second antenna using the common frequency band and a second frequency band. Herein, the first antenna may use the first band Tx and the second antenna may use the first band Rx.

According to various embodiments of the present disclosure, the first band Tx or the first band Rx may be included in the common frequency band.

According to various embodiments of the present disclosure, an electronic device may further include a CP for applying CA to the first band Tx and the second band Tx or applying CA to the first band Rx and the third band Rx. According to various embodiments of the present disclosure, the second band the third band may be the same band. Additionally, the first band Tx and the second band Tx or the first band Rx and the third band Rx may be adjacent to each other.

According to various embodiments of the present disclosure, the electronic device may further include a separation device for separating the first band Tx from the second band Tx or the first band Rx from the third band Rx.

According to various embodiments of the present disclosure, the first frequency band may be continuous to the common frequency band and the second frequency band may be continuous to the common frequency band.

According to various embodiments of the present disclosure, the common frequency band that the first antenna uses may include an LTE band 1 Tx and the common frequency band that the second antenna uses may include an LTE band 2 Rx.

According to various embodiments of the present disclosure, the first frequency band may include fourth band Tx and Rx and the second frequency band may include fifth band Tx and Rx.

According to various embodiments of the present disclosure, an electronic device may further include a third antenna using at least part of the first frequency band or at least part of the second frequency band.

According to various embodiments of the present disclosure, an electronic device supporting communication with another electronic device may include an antenna and a communication processor functionally connected to the antenna. The communication processor transmits and receives a first signal corresponding to a first frequency band through the antenna and may perform one of the transmission and the reception of a second signal corresponding to a second frequency band through the antenna.

According to various embodiments of the present disclosure, the communication processor may perform the other one of the transmission and the reception of the second signal.

According to various embodiments of the present disclosure, the communication processor may transmit and receive a third signal corresponding to a third frequency band through the other antenna.

According to various embodiments of the present disclosure, the first frequency band may include a lower frequency band than the third frequency band.

According to various embodiments of the present disclosure, the communication processor may perform CA on the first signal and the second signal.

According to various embodiments of the present disclosure, at least part of the reception frequency band of the first signal and the reception frequency band of the second signal may include the same frequency band.

According to various embodiments of the present disclosure, the communication processor may perform one of the transmission and the reception of a third signal corresponding to a third frequency band through the antenna.

According to various embodiments of the present disclosure, the communication processor may perform the other one of the transmission and the reception of the third signal through the antenna.

According to various embodiments of the present disclosure, the communication processor may perform CA on the second signal and the third signal.

According to various embodiments of the present disclosure, an electronic device for communicating with another electronic device may include a first antenna, a second antenna, and a communication processor functionally connected to the first antenna and the second antenna. The communication processor transmits a first signal corresponding to a first frequency band and a second signal corresponding to a second frequency band through the first antenna and may receive the first signal and the second signal through the second antenna.

According to various embodiments of the present disclosure, the communication processor may perform CA on the first signal and the second signal.

According to various embodiments of the present disclosure, the communication processor may transmit and receive a third signal corresponding to a third frequency band through the first antenna.

According to various embodiments of the present disclosure, the communication processor may transmit and receive a third signal corresponding to a third frequency band through the second antenna.

As described above, according to the various embodiments of the present disclosure, an electronic may physically separate Tx and Rx of a specific frequency band by using at least two antennas.

Additionally, according to various embodiments of the present disclosure, an electronic device may reduce the need for the use of a duplexer by separating Tx and Rx of a specific frequency band.

Further, according to various embodiments of the present disclosure, an electronic device may support CA for a plurality of signals transmitted/received through an adjacent band by physically separating Tx and Rx of a specific frequency band.

At least part of a device (for example, modules or functions thereof) or a method (for example, operations) according to this disclosure, for example, as in a form of a programming module, may be implemented using an instruction stored in computer-readable storage media. When at least one processor executes an instruction, it may perform a function corresponding to the instruction. The non-transitory computer-readable storage media may include the memory 130, as illustrated in FIG. 1, for example.

The non-transitory computer-readable storage media may include hard disks, floppy disks, magnetic media (e.g., magnetic tape), optical media (e.g., compact disc ROM (CD-ROM), and DVDs), magneto-optical media (e.g., a floptical disk), and hardware devices (e.g., a ROM, a RAM, or a flash memory).

Additionally, a program instruction may include high-level language code executable by a computer using an interpreter in addition to machine code created by a compiler. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

While the present disclosure has particularly shown and described certain embodiments thereof, it will be understood by those of ordinary skill in the art that various changes in form and details may be made therein without departing from the spirit and scope of the present disclosure as defined by the following claims and their equivalents.

What is claimed is:

1. An electronic device comprising:
   a first antenna;
   a second antenna;
   a low frequency band signal processing block;
   a common frequency band signal processing block; and
   a communication processor configured to transmit and receive a first specified signal corresponding to a first frequency band through the low frequency band signal processing block and the first antenna, perform one of transmitting and receiving a second specified signal corresponding to a second frequency band through the common frequency band signal processing block and the first antenna, wherein at least part of a reception frequency band of the first specified signal and a reception frequency band of the second specified signal overlap, and perform the other one of the transmitting and receiving the second specified signal through the common frequency band signal processing block and the second antenna.

2. The device of claim 1, wherein the communication processor is further configured to transmit and receive a third specified signal corresponding to a third frequency band through the second antenna.

3. The device of claim 2, wherein the first frequency band comprises a lower frequency band than the third frequency band.

4. The device of claim 1, wherein the communication processor is further configured to perform carrier aggregation (CA) on the first specified signal and the second specified signal.

5. The device of claim 1, wherein the communication processor is further configured to perform one of transmitting and receiving a third specified signal corresponding to a third frequency band through the first antenna.

6. The device of claim 5, wherein the communication processor is further configured to perform the other one of the transmitting and receiving the third specified signal through the first antenna.

7. The device of claim 5, wherein the communication processor is further configured to perform carrier aggregation (CA) on the second specified signal and the third specified signal.

8. An electronic device comprising:
a first antenna configured to support a common frequency band and a first frequency band lower than the common frequency band;
a second antenna configured to support the common frequency band and a second frequency band higher than the common frequency band; and
a communication processor configured to transmit a first Tx signal corresponding to the first frequency band and a second Tx signal corresponding to the common frequency band through the first antenna, and to receive a first Rx signal corresponding to the common frequency band and a second Rx signal corresponding to the second frequency band through the second antenna, wherein at least part of a frequency band of the second Tx signal and a frequency band of the first Rx signal overlap.

9. The device of claim 8, wherein the communication processor is further configured to perform carrier aggregation (CA) on the first Rx signal and the second Rx signal.

10. The device of claim 8, wherein the communication processor is further configured to transmit and receive a third Tx signal corresponding to a third frequency band through the first antenna.

11. The device of claim 8, wherein the communication processor is further configured to transmit and receive a third Rx signal corresponding to a third frequency band through the second antenna.

12. An electronic device comprising:
a low frequency band signal processing block;
a common frequency band signal processing block;
a first antenna configured to use the low frequency band signal processing block, the common frequency band signal processing block, a common frequency band and a first frequency band; and
a second antenna configured to use the common frequency band signal processing block, the common frequency band and a second frequency band,
wherein the first antenna uses a first band transmission (Tx) and the second antenna uses a first band reception (Rx), the second antenna receives a first specified signal and a second specified signal within the common frequency band.

13. The electronic device of claim 12, further comprising a communication processor (CP) configured to apply carrier aggregation (CA) to the first band Tx and a second band Tx, or to apply the CA to the first band Rx and a third band Rx.

14. The electronic device of claim 13, further comprising a separation unit configured to separate the first band Tx from the second band Tx, or to separate the first band Rx from the third band Rx.

15. The electronic device of claim 12, wherein the common frequency band comprises:
a long term evolution (LTE) band 1 Tx used by the first antenna; and
an LTE band 2 Rx used by the second antenna.

16. The electronic device of claim 12, wherein the first frequency band comprises:
a fourth band Tx; and
a fourth band Rx, and
wherein the second frequency band comprises:
a fifth band Tx; and
a fifth band Rx.

17. The electronic device of claim 12, further comprising a third antenna configured to use at least part of the first frequency band or at least part of the second frequency band.

* * * * *